Jan. 4, 1955
Filed Nov. 19, 1951

J. H. EISELE ET AL
DRY DISK RECTIFIER ASSEMBLED FROM
UNPERFORATED RECTIFIER PLATES 2,698,918
4 Sheets-Sheet 1

INVENTORS
JOSEF H. EISELE
ALBRECHT R. GEISSELSODER
BY [signature]
ATTORNEY

Jan. 4, 1955 J. H. EISELE ET AL 2,698,918

DRY DISK RECTIFIER ASSEMBLED FROM UNPERFORATED RECTIFIER PLATES

Filed Nov. 19, 1951 4 Sheets-Sheet 2

INVENTORS
JOSEPH H. EISELE
ALBRECHT R. GEISSELSODER
BY [signature]
ATTORNEY

INVENTORS
JOSEF H. EISELE
ALBRECHT R. GEISSELSODER
BY [signature]
ATTORNEY

Jan. 4, 1955

J. H. EISELE ET AL

DRY DISK RECTIFIER ASSEMBLED FROM UNPERFORATED RECTIFIER PLATES 2,698,918

Filed Nov. 19, 1951

4 Sheets-Sheet 4

INVENTORS
JOSEF H. EISELE
ALBRECHT R. GEISSELSODER
BY
[signature]
ATTORNEY

United States Patent Office
2,698,918
Patented Jan. 4, 1955

2,698,918

DRY DISK RECTIFIER ASSEMBLED FROM UNPERFORATED RECTIFIER PLATES

Josef H. Eisele, Altenfurth (Bayern), and Albrecht R. Geisselsöder, Nurnberg (Bayern), Germany, assignors to International Standard Electric Corporation, New York, N. Y., a corporation of Delaware Application November 19, 1951, Serial No. 257,001

Claims priority, application Germany November 25, 1950

7 Claims. (Cl. 317—234)

It is known that dry disc rectifiers for higher back voltage ratings are assembled by stacking individual rectifying plates. Contact elements provide electrical contact between the individual plates. Such an arrangement is called a rectifier stack. The plates are mostly stacked in a way that the plates and contact elements, perforated in their centers, are assembled around a pin and held assembled, for example, by screws. With small-size rectifier plates the central perforation takes a high percentage of the effective rectifier area. It is thus advantageous in this respect if unperforated rectifier plates are used and assembled in a column. With the same per-unit surface load of the rectifier, one thus attains smaller dimensions or with equal physical size of the plates a higher power rating. The invention relates to the assembly of dry disc rectifiers from unperforated rectifying elements of square, circular, or any other shape which are stacked preferably with some spacing between elements. The invention is characterized by the fact that the elements are positioned and insulated by a small part of their circumference, for example, their corners—engaging, in a preferred design two opposite grooves or flutes, etc., which are provided in an enclosure shaped, for example, as a U with no bottom and top, and that by completing the enclosure by closing the open side, the plates are definitively fixed in place. By means of the characterized enclosures, the stacks may even be attached to the base. This smoke-stack type assembly at the same time provides for good cooling of the rectifier columns. To make the enclosures characterized by the invention, a great variety of materials may be used, such as plastics, sheet metal, with and without an insulating coating, or any other material useful for the purpose at hand. The contact elements, springs, etc., between the rectifier plates which effect contact between the plates while they hold them at a predetermined separation, are conveniently so arranged that they are held positioned by the same grooves, flutes, etc., as the rectifying elements. The enclosures consist preferably of two parts which can be joined by different means such as cementing, riveting, welding, soldering, etc., or by pushing one part into grooves of the other. With all of the possible designs, various kinds of feet, lugs, projections, etc., may be applied which serve to fix the unit to a base in some manner such as by bolting, riveting, binding lugs, etc.

Figure 1:
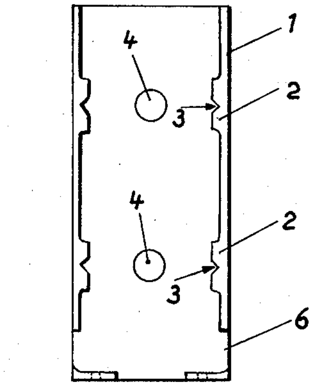
Figure 2:
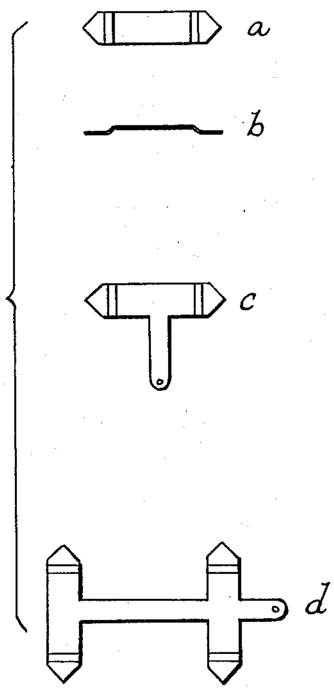
Figure 1A:
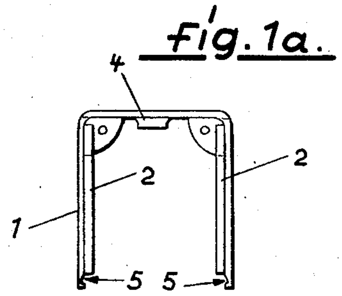
Figure 1D:
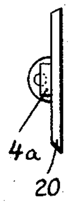
Figure 1C:
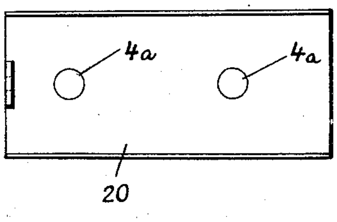
Figure 3:
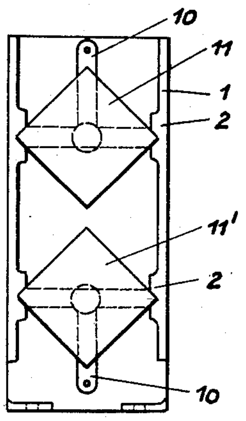
Figure 4:
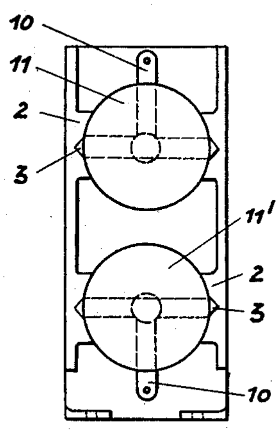
Figure 5A:
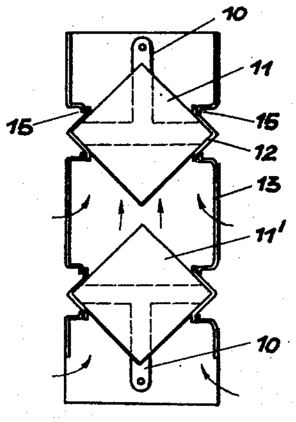
Figure 5B:
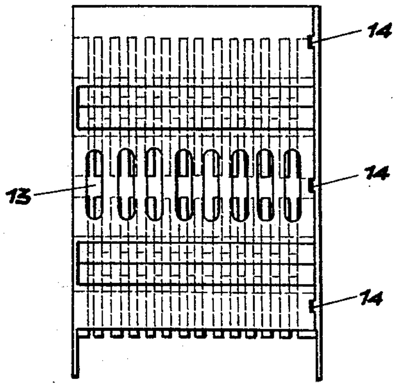
Figures 5C, 5D:
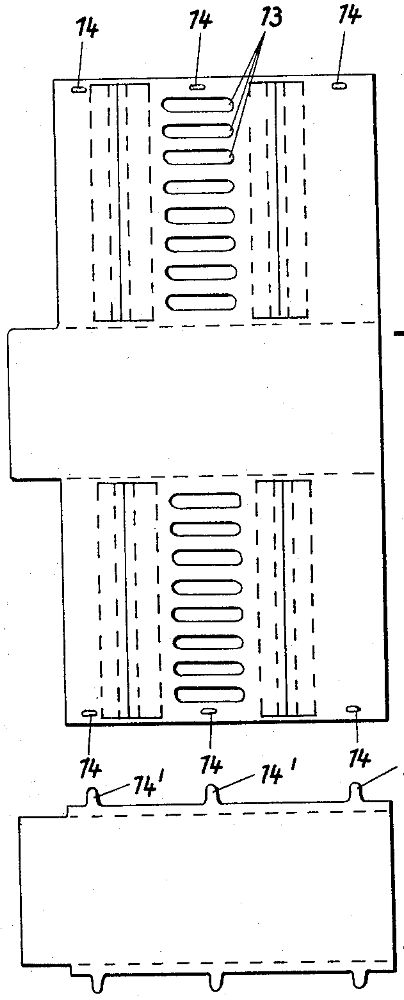
Figures 6, 7, 7A, 8, 8H:
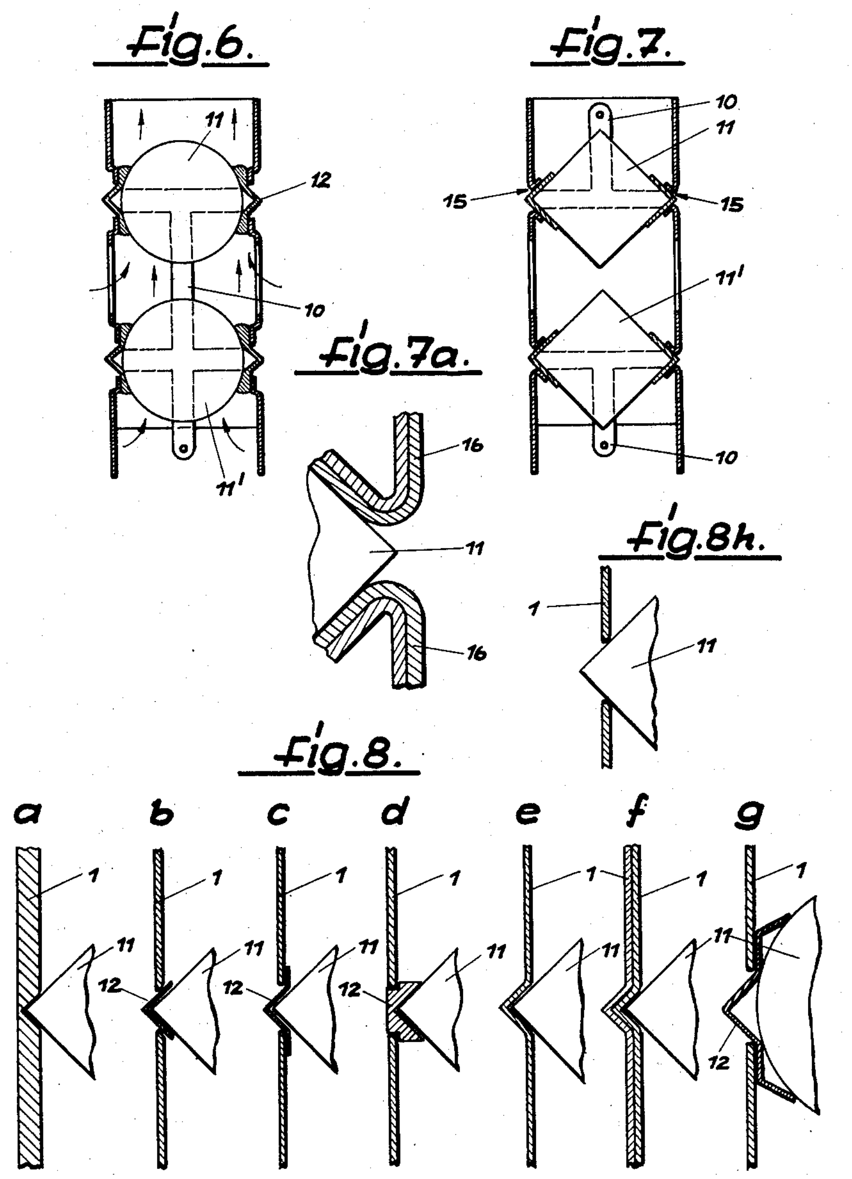

In the accompanying figures, a few embodiments are shown. The Figs. 1 and 1–A relate to an embodiment using some insulating material, for example, plastics, in which two stacks are arranged above each other. 1 relates to the wall of the enclosure. At its inside it has at the places 2 ledge-like projections with approximately square grooves 3 which serve to hold the rectifier plates—assumed in this case to be square plates—and the contacting elements, springs, etc. To prevent the contact springs from resting straight on the front and back walls respectively with their ends, cylinder-shaped projections 4 are provided. At 6, the lateral walls provide cut-outs for air circulation. Fig. 1 is a front view of the described arrangement, while Fig. 1–A shows the plan view. In the latter, the perpendicular grooves are visible at 5, into which one slides the mating part 20 to close up the open side. The Figs. 1–C and 1–D show front and plan views of the mating part 20. It has equally two projections 4*a* which are to prevent the contact springs from bearing right on this part 20 as in the assembly mentioned above. Fig. 2 (A–D) shows some possible forms of contact springs. Fig. 3 shows the same mounting principle as Fig. 1, but with rectifier plates 11 and 11' in place, and contact springs 10. Fig. 4 shows an embodiment using an insulating material such as plastics, which is used conveniently for circular rectifier plates. The holding ledge 2 retains even in this case its angular groove 3 to allow the same contact springs to be used as in the arrangements with square plates. Fig. 5–A shows a sheet metal design. At the place 15, the sheet metal has been cut up and folded back to the inside. At this place, insulating ledges 12 profiled accordingly are placed which serve to accommodate the rectifier plates and contact elements. At 13, slots are provided in the center part for better air circulation. The ascending air heated by the rectifier stack 11' sucks in at this place a supply of fresh air which serves to cool the upper stack 11. This achieves better cooling of the top column. 5–B shows the same arrangement in a lateral view. The second part of the enclosure is fixed in place by inserting small lugs into corresponding holes of the mating part and bending them at 14. The Figs. 5–C and 5–D show the punching for this arrangement described herein, in which the holes 14 and the lugs 14' are plainly visible. At the dashed lines, the plate is bent over in a right angle. Fig. 6 shows the same arrangement for circular rectifier plates.

Here an insulating ledge 12 of a different shape is used. In Fig. 7, the sheet metal section is bent differently at the place 15 from the Figs. 5 and 6. The insulating ledge 12 has thus a simpler cross section. The enclosing sheet metal may be coated with insulating material at its outside. In this case the insulating ledge 12 as shown in Fig. 7–A is no longer necessary. In this figure, 16 refers to the insulating coating. The Figs. 8–A to 8–H suggest further possible attachments of the plates in the enclosure. If the latter is made of an insulating material of some thickness, angular grooves may be cut in the wall as in Fig. 8–A. With models using thin plastics, corresponding grooves as shown in Fig. 8–E may be directly molded into the enclosure. With sheet metal designs, an insulating strip 12 as in the Figs. 8–B, 8–C, or 8–D is conveniently placed in a slot. In Fig. 8–F, a design of a molded angular groove is shown, while the wall of the cabinet is formed by a plate coated with an insulating layer. 1 refers to the sheet metal, 16 to the insulating coating at the inside. Fig. 8–G shows a possible design similar to the Figs. 8–B to 8–D which can accommodate circular as well as angular rectifier plates. With the designs using bare sheet metal, insulating discs shaped about in accordance with the rectifier plates are conveniently placed ahead of, and behind, the stack. In Fig. 8–H, the rectifier plates rest straight in the slot of the insulating enclosure.

While we have described above the principles of our invention in connection with specific embodiment, it is to be clearly understood that this description is made only by way of example and not as a limitation to the scope of our invention.

What is claimed is:

1. A dry disc rectifier assembly for mounting a stack of dry disc rectifier plates comprising an enclosure having one openable side, means supported from said enclosure providing therein a plurality of aligned grooves each of a dimension adapted to receive a small portion of the perimeter of each of the rectifier plates, the grooves extending at right angles to the plane of the rectifier plates, a plurality of rectifier plates each having said small portion of their perimeter slid inside the same one of said grooves, at least two such portions of each plate being supported within grooves, and a cover for closing said one side after the rectifier plates have been inserted in the grooves to lock the plates therewithin.

2. A dry disc rectifier assembly according to claim 1 wherein the walls are metal, but the parts forming the grooves are of insulating material.

3. A dry disc rectifier assembly according to claim 1 wherein the enclosure is made of insulating material.

4. A dry disc rectifier assembly according to claim 1 wherein the enclosure is U shaped in cross section and the grooves are formed on opposite walls thereof.

5. A dry disc rectifier assembly according to claim 1 in which the enclosure is further provided with apertures to admit cooling air.

6. A dry disc rectifier assembly according to claim 1 further including spring members supported within said grooves and holding the plates under spring tension.

7. A dry disc rectifier assembly according to claim 1 further including contact elements supported within said grooves.

References Cited in the file of this patent

UNITED STATES PATENTS

| | | |
|---|---|---|
| 2,369,185 | Skinker | Feb. 13, 1945 |
| 2,545,863 | Sell et al. | Mar. 20, 1951 |

FOREIGN PATENTS

| | | |
|---|---|---|
| 591,691 | Germany | Jan. 25, 1934 |